Dec. 10, 1940.   J. SALMEN   2,224,276
MOTOR CONTROLLING DEVICE
Filed Aug. 28, 1939   2 Sheets-Sheet 1

INVENTOR.
John Salmen.
BY
Ross J. Woodward ATTORNEY

Dec. 10, 1940.  J. SALMEN  2,224,276
MOTOR CONTROLLING DEVICE
Filed Aug. 28, 1939  2 Sheets-Sheet 2
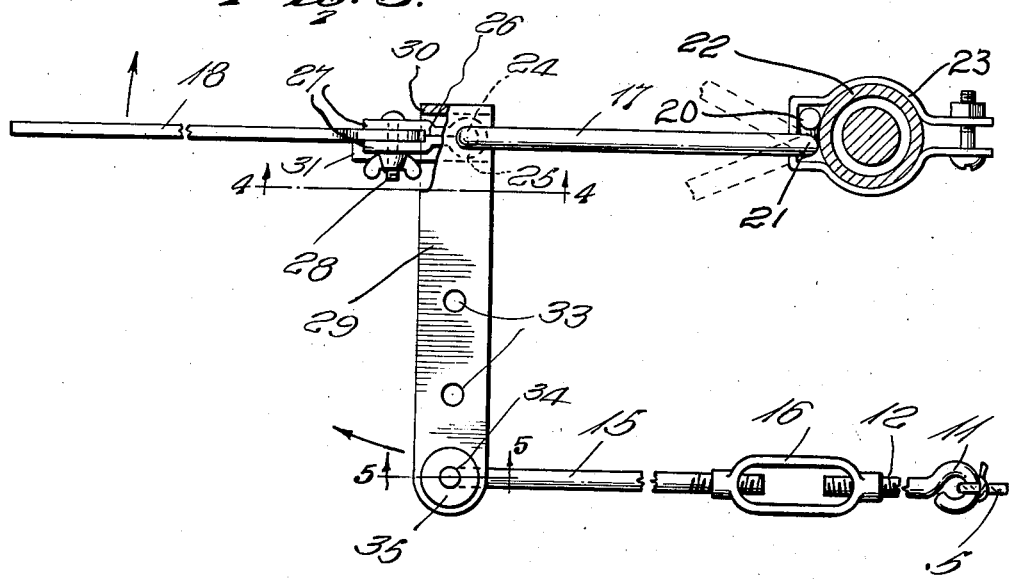
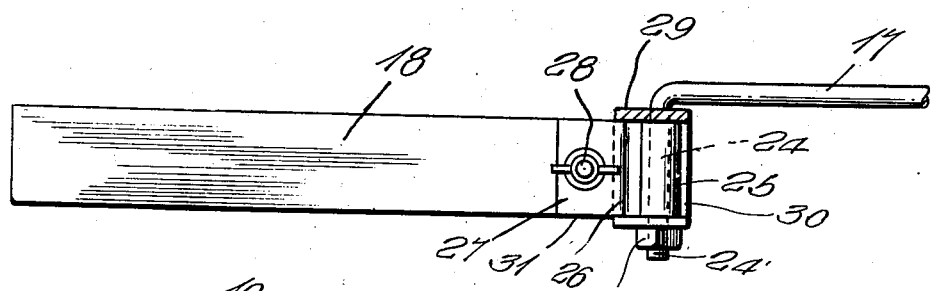
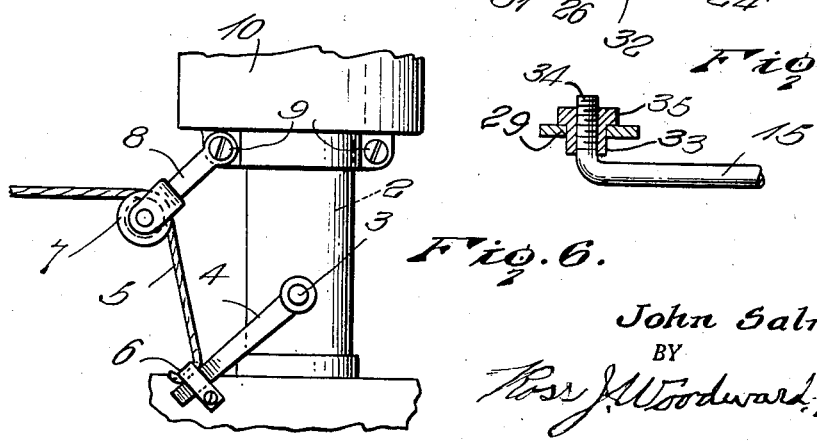
INVENTOR.
John Salmen.
BY
Ross J. Woodward, ATTORNEY Patented Dec. 10, 1940

2,224,276

UNITED STATES PATENT OFFICE 2,224,276

MOTOR CONTROLLING DEVICE

John Salmen, Deadwood, S. Dak., assignor to Safety Motor Control Co., Inc., Deadwood, S. Dak., a corporation of South Dakota Application August 28, 1939, Serial No. 292,343

7 Claims. (Cl. 74—515)

This invention relates to a motor controlling device and it is one object of the invention to provide a device of this character which constitutes means for adjusting the carburetor throttle valve and is adapted to be operated by the knees or legs of the driver of an automobile or other motor vehicle. It will thus be seen that this valve will not be hand operated, thus making it easier for the driver to control the motor vehicle.

Another object of the invention is to provide valve operating means which is of such construction that a bracket carrying a blade or lever is adapted to be mounted on the steering column in such position that the lever may be set to operate inside or outside of either the right or left knee or leg of the driver and moved thereby to effect opening or closing of the carburetor valve.

Another object of the invention is to so mount the bracket that it may be adjusted longitudinally of the steering column and firmly secured in such position that the lever or blade may be easily engaged between the knees or outside the knee or leg of the driver.

Another object of the invention is to provide a device of this character which may be connected with a carburetor of a conventional construction and have its bracket very easily secured to a conventional steering column in predetermined position thereon.

The invention is illustrated in the accompanying drawings, wherein:

Fig. 3 is a mechanism of Fig. 2, partially in top plan and partially in section.

Fig. 4 is a view taken on the line 4—4 of Fig. 3.

Fig. 5 is a sectional view taken on the line 5—5 of Fig. 3.

Fig. 6 is a view showing the carburetor in side elevation and illustrating the manner in which the pull line is connected therewith.

Figure 1:
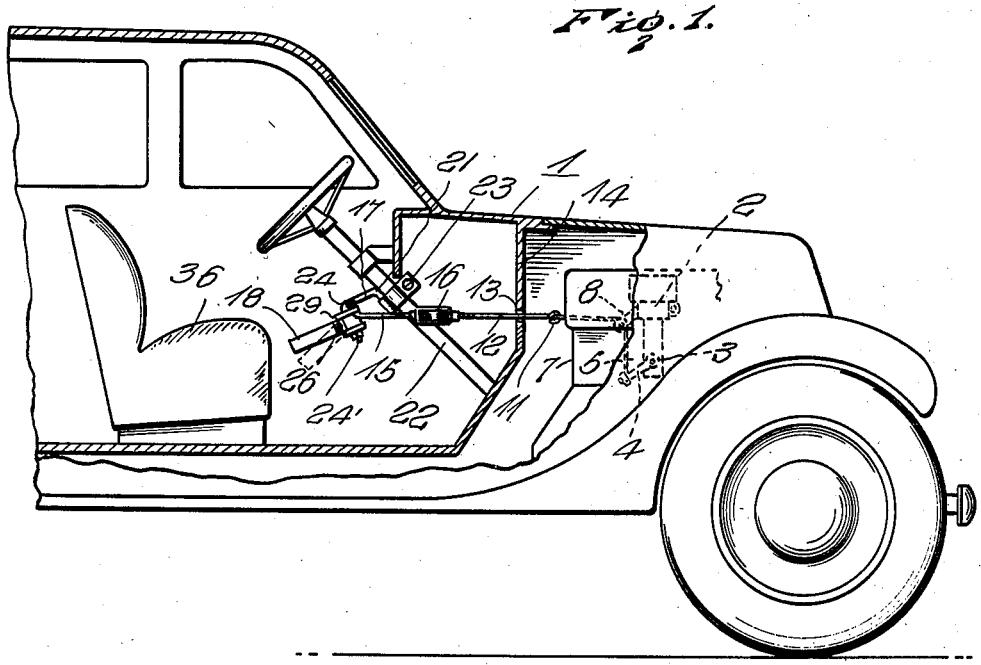
Fig. 1 is a view partially in side elevation and partially in vertical section, showing the improved device in position for use.
Figure 2:
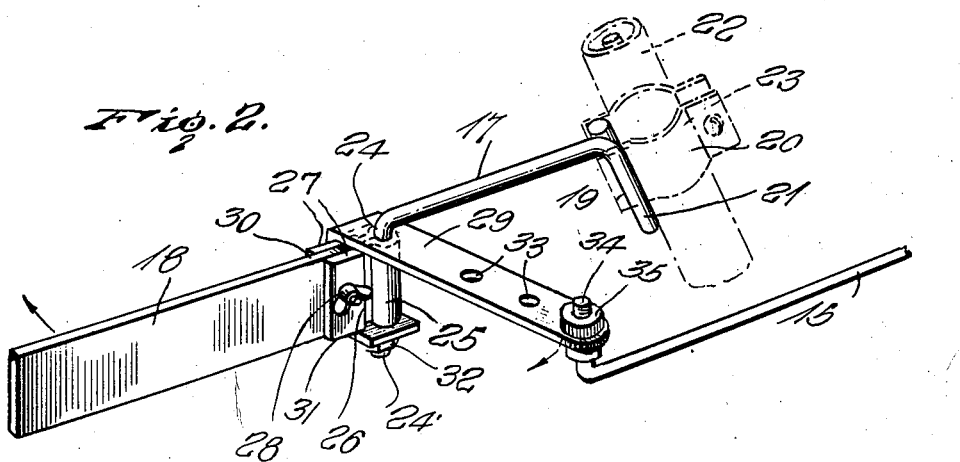
Fig. 2 is a perspective view of the bracket carried by the steering column, together with the blade or lever carried by the bracket and the side arm which projects laterally from the bracket.

The automobile shown in Fig. 1, and indicated in general by the numeral 1, represents a conventional motor vehicle having an internal combustion engine including a carburetor 2 provided with the usual throttle valve 3 having a lever arm 4 by means of which it is opened and closed.

When the controlling device constituting the subject matter of this invention is installed for use, a pull line or wire cable 5 has one end connected with the lever 4 by a clamp 6. This pull line or cable is trained about the pulley wheel 7 carried by a hanger 8 which is held in place by one of the bolts 9 of the air cleaner 10. The pull line extends rearwardly from the bracket 8 and, at its rear end, is tied or otherwise firmly secured to the eye 11 which slidably passes through an opening 13 in the dashboard 14 and is connected with the companion rod 15 by a turn-buckle 16. The pull line and the rods 12 and 15 constitute a connection leading to the lever arm 4 and since the rods are connected by the turnbuckle, this connection may be longitudinally adjusted for efficient operation of the lever arm 4 and proper opening and closing of the valve 3. The bracket 17 carrying the knee-operated actuating blade or lever 18 is formed of a stiff metal rod having one end portion bent downwardly, as shown at 19, and then folded back in spaced relation to itself, as shown at 20, to provide a flat, hook-shaped shank 21 of such width that when it is disposed against the steering column 22 and secured by the clamp 23, the bracket will be firmly held in engagement with the steering column and prevented from swinging transversely of the column out of its proper position thereon. It will also be obvious that the bracket may be shifted longitudinally of the steering column when the clamp is loosened and again firmly secured in set position. Therefore, the knee or leg operated mechanism may be so adjusted on the steering column that it will be in position to be conveniently operated by the driver of the motor vehicle. The rear end portion of the rod from which the bracket is formed is bent downwardly to form a pintle 24 having a threaded lower end portion 24' about which is loosely mounted the sleeve 25 of a clamp or bracket 26 between the jaws 27 of which the blade or lever 18 is firmly secured by a bolt 28 having a winged nut thereon. A side arm 29, which, together with the blade 18, forms a bell crank lever, projects laterally from the bracket or clamp 26 and has its inner end portion bent downwardly, as shown at 30, against a side face of the clamp and then inwardly under the clamp to form a lip or flange 31. The sleeve 25 of the clamp or bracket 26 fits loosely about the pintle 24 between the lip 31 and the inner end of the side arm 29 and these portions of the metal strip from which the side arm is formed are drilled to form openings registering with the sleeve 25, and through which the pintle passes. A nut 32 is screwed upon the threaded lower end portion 24' of the pintle and when tightened serves to hold the side arm and the clamp or bracket in place upon the pintle.

A plurality of openings are formed in the side arm in spaced relation to each other and through a selected one of these openings is passed the upturned end 34 of the rod 15. This upturned end or pin 34 is threaded, as shown in Fig. 5, and is engaged in the threaded bore of a sleeve nut 35 which, when tightened, holds the pin 34 in place through the selected opening of the side arm and constitutes a bearing member for the rod. By swinging the side arm back and over the lever or blade 18 to the other side thereof, the control may then be operated on the outside of the knee or leg.

When the improved mechanism is in use, it is installed, as shown in Fig. 1, with the bracket 17 secured on the steering column and the pull line 5 connected with the lever arm 4 of the carburetor valve. The pulley bracket 8 is mounted, as shown in Fig. 6, and the opening 13 formed in the dashboard to receive the rod 12. After the rod 12 has been passed through the opening 13, it is connected with the rod 15 by the turnbuckle 16 and the turnbuckle is tightened until the pull line is under proper tension. If desired, a wire cable or pull line of the proper length may be employed, this cable being passed through the opening 13 and having its rear end secured to the side arm 29. By bending the bracket toward the left, the blade will be disposed in position for operation by the left leg instead of the right leg. The driver of the motor vehicle occupies the driver's seat 36 back of the steering column and when the bracket 17 is properly located on the steering column, the blade or lever 18 will be disposed between his knees, or outside knee or leg, however set. By moving his knee or leg transversely of the automobile, the blade or lever 18 will be swung laterally with the clamp bracket 26 turning about the pintle 24 and the side arm 29 swung longitudinally of the automobile to exert pull upon the cable 5 or slacken this cable, according to the direction in which the lever 18 is moved. When the lever 18 is moved in one direction, the lever arm 4 will be drawn upwardly to open the valve 3 and when the lever 18 is let loose, the spring in the carburetor will close the valve. It will thus be seen that the operation of the device will be entirely knee or leg controlled, for opening the valve 3.

By loosening the nut of the bolt 28, the blade may be tilted to a position in which it may conveniently operated and the nut then again tightened to hold the blade in the adjusted position.

Having thus described the invention, what is claimed is:

1. In combination with a motor vehicle including a steering column and a motor equipped with a carburetor having a throttle valve provided with an operating lever arm; a bracket consisting of a rod having an end portion bent downwardly and back upon itself to form a wide shank having portions in side by side relation to each other, a clamp for securing said shank firmly against said steering column in predetermined location thereon with the bracket extending rearwardly from the steering column and held against swinging movement by the reversely bent side portion of the shank, the rear end portion of the rod being bent to form a pintle at the rear end of the bracket, a bell crank lever pivoted on said pintle in position for actuation by the knee or leg of a person occupying the driver's seat of the vehicle, and means connecting said bell crank lever with the lever arm of the throttle valve for adjusting the throttle valve when the bell crank lever is moved.

2. In combination with a motor vehicle including a steering column and a motor equipped with a carburetor having a throttle valve provided with an operating lever arm; a bracket, means for securing said bracket to said steering column in position to extend rearwardly therefrom, a pintle at the rear end of said bracket, a lever having a bearing pivotally mounted on said pintle and mounting the lever in position to extend rearwardly from the bracket for actuation by the knee or leg of a person occupying the driver's seat of the vehicle, a side arm extending transversely from said lever and having its inner end portion extending across the bearing and bent downwardly at one side of the bearing and terminating in a lip extending under the bearing, said pintle passing through the inner end of the side arm and its lip for holding the side arm in place, and means connecting said side arm with the lever arm of the throttle valve for adjusting the throttle valve when the lever is moved.

3. In combination with a motor vehicle including a steering column and a motor equipped with a carburetor having a throttle valve provided with an operating lever arm; a bracket, means for securing said bracket to the steering column in position to extend rearwardly therefrom, a pintle at the rear end of said bracket, a lever having a bearing pivotally carried by said pintle and extending rearwardly therefrom for actuation by the knee or leg of a person occupying the driver's seat of the vehicle, a side arm extending transversely of the lever from the bearing and having a hook-shaped inner end portion fitting transversely about the bearing and formed with openings registering with upper and lower ends of the bearing and through which the pintle passes to hold the arm in place and mount the arm for swinging movement about the pintle with the bearing, and means connecting said arm with the operating arm of the throttle valve and actuating the throttle valve when the lever and the side arm are swung about the pintle.

4. In combination with a motor vehicle including a steering column and a motor equipped with a carburetor having a throttle valve provided with an operating lever arm; a bracket, means for securing said bracket to said steering column in position to extend rearwardly therefrom, a pintle at the rear end of said bracket, a lever pivotally carried by said pintle and extending rearwardly therefrom for actuation by the knee or leg of a person occupying the driver's seat of the vehicle, a side arm extending transversely from said lever, a pull line connected at one end to the lever arm of the throttle valve, a rod slidably passed through the dashboard of the vehicle, the rear end of said pull line being connected to the front end of said rod, a rear rod having its rear end portion bent to form a stem passed through an opening in said side arm, a fastener carried by said stem to hold the same in engagement with the side arm, and a turnbuckle connecting said rods and tightened to tension the pull line for right opening position.

5. In combination with a motor vehicle, a motor equipped with a carburetor having a throttle valve, and a steering column; a bracket carried by said steering column and extending rearwardly therefrom and provided with a vertical pintle, said bracket being angularly adjustable to project laterally from the steering post in the direction of a predetermined side of the steering post, a side arm having a hook-shaped inner end portion pivoted on said pintle and movable about the same to dispose the arm in position to project from a selected side of the bracket, a lever pivoted to said pintle within the hook-shaped inner end portion of said arm for swinging movement about the same when swung in one direction being adapted to engage the bridge of the hook-shaped portion of the side arm and swing the side arm about the pintle with the lever, and means connecting the side arm with the throttle valve for adjusting the throttle valve when the lever and side arm are moved about the pintle.

6. Actuating mechanism for a carburetor valve comprising a bracket, means for securing said bracket to a steering column, a pintle carried by said bracket, a side arm having a head at its inner end open at one side and formed with upper and lower openings receiving said pintle to pivotally mount the side arm, a bearing member pivotally mounted about said pintle within said head, said side arm being movable about the pintle and across the bearing member into position to project from a selected side of the bracket, a lever carried by said bearing member for swinging the same about the pintle into engagement with the closed side of the head to swing the side arm about the pintle with the bearing member, and means for connecting the side arm with the valve of a carburetor.

7. In combination with a motor vehicle including a steering column and a motor equipped with a carburetor having a throttle valve provided with an operating lever arm; a bracket, means for securing said bracket to said steering column, a pintle carried by said bracket, a lever having a bearing pivotally mounted in said pintle and mounting the lever in position to extend from the bracket, a side arm extending transversely from said lever and having a substantially U-shaped inner end portion straddling the bearing transversely thereof and formed with upper and lower openings through which the pintle passes to hold the side arm in place about the bearing and mount the side arm for pivotal movement with the lever, and means for connecting said side arm with the lever arm of the throttle valve for adjusting the throttle valve when the lever and side arm are moved about the pintle.

JOHN SALMEN.